(No Model.)
T. DILLON.
TIRE TIGHTENER.
No. 249,595. Patented Nov. 15, 1881.
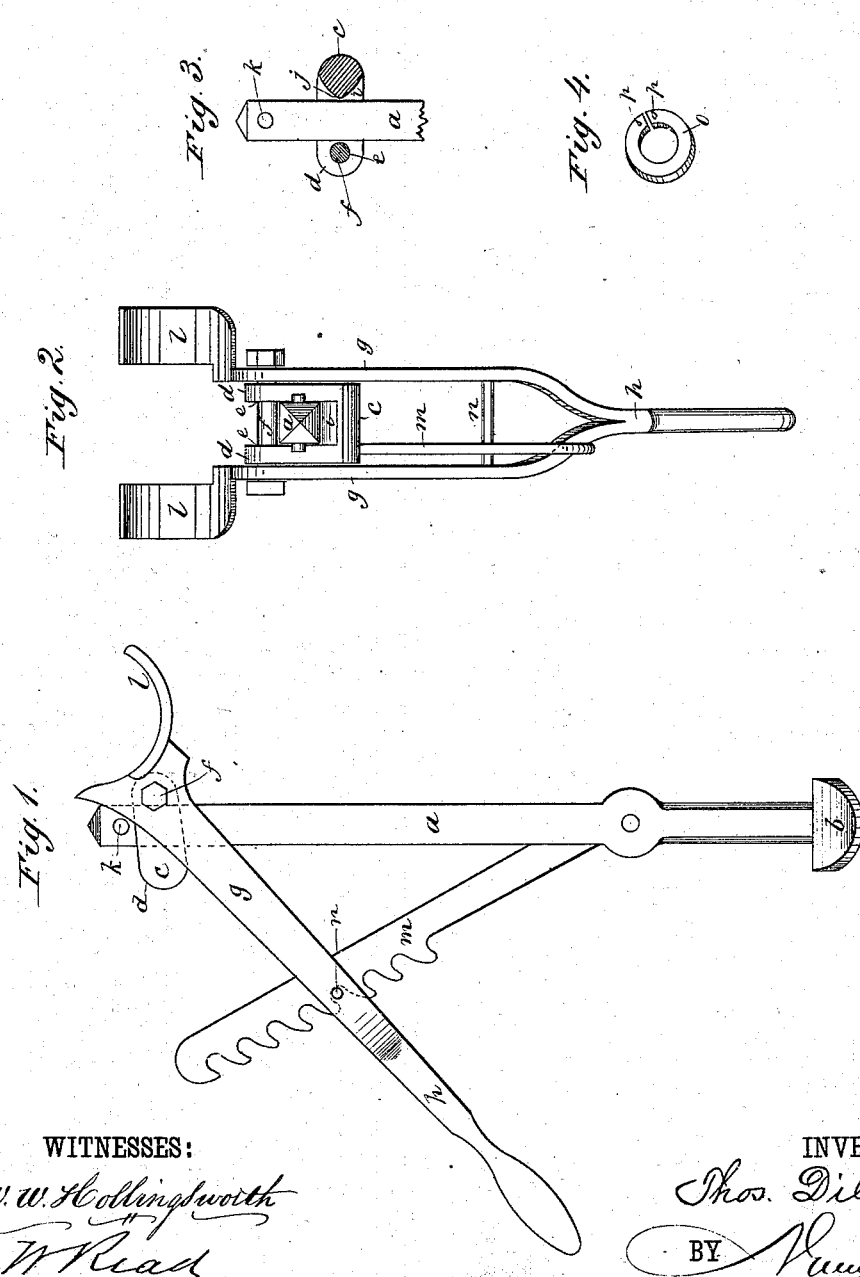

United States Patent Office.

THOMAS DILLON, OF HIGHLAND, OHIO.

TIRE-TIGHTENER.

SPECIFICATION forming part of Letters Patent No. 249,595, dated November 15, 1881.

Application filed August 26, 1881. (No model.)

*To all whom it may concern:*

Be it known that I, THOMAS DILLON, of Highland, in the county of Highland and State of Ohio, have invented a new and useful Improvement in Tire-Tighteners; and I do hereby declare that the following is a full, clear, and exact description of the same, reference being had to the accompanying drawings, forming part of this specification, in which—

Figure 1 is a side elevation of my improved tire-tightener. Fig. 2 is a plan view. Fig. 3 is a detail sectional view of the friction-clamp. Fig. 4 is a perspective view of the split washer.

My invention relates to improvements in tire-tighteners; and it consists in the peculiar construction and arrangement of the parts, as hereinafter more fully set forth.

In the accompanying drawings, $a$ represents the standard of my improved tire-tightener, provided with the foot $b$, having its lower face curved to conform with the hub of a wheel, on which it is designed to rest.

$c$ represents a friction-slide provided with arms $d$ $d$, having holes $e$ near their outer ends for the passage of a headed bolt, $f$, provided with a nut, which bolt also passes through holes near the ends of the arms $g$ of the bifurcated lever $h$. The inner face of the friction-slide $c$, at the base of the opening $i$, between the arms $d$ $d$ and bolt $f$, through which opening the standard $a$ passes, is beveled at top and bottom, the two inclined planes meeting in an edge, $j$, adapted to bite the standard $a$ and hold the friction-slide $c$, in conjunction with the bolt $f$, in position on the standard when the slide has been adjusted on the standard and moved out of horizontal position. The upper end of the standard $a$ is provided with a pin, $k$, to limit the upward movement of the friction-slide $c$ on the standard. Each of the arms $g$ of the bifurcated lever $h$ is provided with an arm, $l$, at its outer end, curved upwardly and adapted to engage under the lower face of the rim of a wheel.

$m$ represents a ratchet-bar, pivoted to the standard $a$ near its lower end and projecting into the opening between the arms of the bifurcated lever $h$.

$n$ represents a rod extending transversely between the arms of the bifurcated lever $h$ and adapted to engage with the teeth of the ratchet-bar $m$ and hold the bifurcated lever $h$ in any desired position.

$o$ represents a split-leather washer, having a headed pin or pins, $p$, passing through it on each side of the split.

The operation of my improved tire-tightener is as follows: The foot of the standard is placed on the hub of the wheel the tire of which is to be tightened, and the bifurcated lever is then adjusted to the height of the rim of the wheel by sliding up the friction-slide, the curved arms on the end of the lever being placed under the rim. The outer end of the lever is then depressed and the rim raised from the shoulder of the spoke and held in position by the ratchet-bar. An open or split washer provided with pins, as described, and of sufficient thickness to supply the waste or shrinkage of rim, is then inserted between the lower face of the rim and the shoulder of the spoke. The tire-tightener is then removed and the rim driven down on the washer, the points of the pins being embedded in the lower face of the rim, and securely holding the washer in place. This operation is repeated for each spoke, and the tire is thus tightened.

If the end of a spoke-tenon flush with the outer face of the rim becomes worn off by a loose tire, the waste may be supplied by moving the tire somewhat to one side at the end of the spoke and applying my improved tire-tightener to the tire and raising it, when a disk of leather is inserted under the tire and on the end of the spoke-tenon to fill up the worn space, and the tire moved back in place on the rim.

I claim as my invention—

The combination of the standard $a$, provided with the curved foot $b$, bifurcated lever $h$, having arms $l$ and rod $n$, friction-slide $c$, pivoted to the bifurcated lever, and pivoted ratchet-bar $m$, substantially as described, and for the purpose set forth.

THOMAS DILLON.

Witnesses:
E. T. REYBURN,
C. A. WOODMANSEE.